United States Patent Office 3,549,632
Patented Dec. 22, 1970

---

3,549,632
3-AMINOPYRIDO[4,3-e]-as-TRIAZINE AND 3 - AMINOPYRIDO[4,3-e]-as-TRIAZINE-1-OXIDE
Benjamin Arthur Lewis, Suffern, and Robert Gordon Shepherd, South Nyack, N.Y., assignors to American Cyanamid Company, Stamford, Conn., a corporation of Maine
No Drawing. Filed Jan. 13, 1969, Ser. No. 790,879
Int. Cl. C07d *57/34*
U.S. Cl. 260—249.5    2 Claims

ABSTRACT OF THE DISCLOSURE

This disclosure describes 3-aminopyrido[4,3-e]-as-triazine and 3-aminopyrido[4,3-e]-as-triazine-1-oxide useful as antibacterial, antifungal and anti-inflammatory agents.

BRIEF SUMMARY OF THE INVENTION

This invention relates to new organic compounds and, more particularly, is concerned with 3-aminopyrido[4,3-e]-as-triazine (I) and 3-aminopyrido[4,3-e]-as-triazine-1-oxide (II) and with methods of preparing these novel compounds. The compounds of the present invention may be represented by the following formulae:

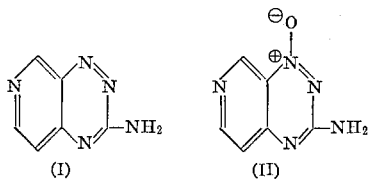

DETAILED DESCRIPTION OF THE INVENTION

The novel compounds of the present invention form non-toxic acid-addition salts with a variety of organic and inorganic salt-forming reagents. Thus, acid-addition salts, formed by admixture of the organic free base with an acid, suitably in a neutral solvent, are formed with such acids as sulfuric, phosphoric, hydrochloric, hydrobromic, sulfamic, citric, lactic, malic, succinic, tartaric, acetic, benzoic, gluconic, ascorbic, and related acids. For purposes of this invention, the free bases are equivalent to their non-toxic acid-addition salts.

The novel compounds of the present invention are yellow crystalline materials having characteristic melting points and absorption spectra and which may be purified by recrystallization from water. They are appreciably soluble in many organic solvents such as methanol, ethanol, acetone, chloroform, and the like. The acid-addition salts of the organic free bases of this invention are, in general, crystalline solids relatively soluble in water, methanol and ethanol but relatively insoluble in non-polar organic solvents such as diethyl ether, benzene, toluene, and the like.

The novel compounds of the present invention are useful as antibacterial and antifungal agents and possess broad-spectrum antibacterial and antifungl activity in vitro against a variety of standard laboratory microorganisms as determined by the agar-dilution streak-plate technique. In this assay, the compounds to be tested are made up to contain 2.5 mg. of test compound per milliliter of solution. Observing sterile techniques, two-fold serial dilutions are made of each test solution. One milliliter of each of the original solutions and of each of the serial dilutions is then added to 9 ml. of warm sterile nutrient agar capable of supporting growth of the bacterial test cultures. A second set of agar dilutions is prepared identical to the first except that the nutrient agar is designed to support the growth of the fungal test cultures. The standard sterile nutrient agar solutions containing the different dilutions of the test compounds, along with suitable and comparable control dilutions containing no test compound, are then allowed to cool in Petri dishes thereby forming solidified agar plates. The test bacteria and yeast-like fungi are prepared for use by growing in broth overnight. The spores of the filamentous fungi are harvested from mature agar slant cultures and are suspended in sterile physiological saline solution. A loopful of each of the resulting live suspensions is then, still employing sterile techniques, streaked upon the surfaces of each of the agar plates and the resulting streaked plates are then incubated. After an appropriate period of time, each of the streaks on each of the plates is inspected visually and the extent, if any, of bacterial or fungal growth is noted. The minimal inhibitory concentration (expressed in micrograms per milliliter) is defined as the concentration of test compound causing complete inhibition of growth of any particular organism.

In a representative operation, the minimal inhibitory concentration of the compounds of this invention against standard laboratory microorganisms as determined in the above-described assay are set forth in Tables I and II below:

TABLE I

In Vitro Antibacterial Activities Minimal Inhibitory Conc. (mcg./m.l)
(I) 3-aminopyrido[4,3-e]-as-triazine
(II) 3-aminopyrido[4,3-e]-as-triazine-1-oxide

| Organism | Compound | |
|---|---|---|
| | (I) | (II) |
| *Bacillus subtilis* ATCC 5633 | 15 | >250i |
| *Clostridium sporogenes* ATCC 7955 | 31 | 31 |

TABLE II

In Vitro Antifungal Activities Minimal Inhibitory Conc. (mcg./ml.)
(I) 3-aminopyrido[4,3-e]-as-triazine
(II) 3-aminopyrido[4,3-e]-as-triazine-1-oxide

| Organism | Compound | |
|---|---|---|
| | (I) | (II) |
| *Trichophyton mentagrophytes* E-11 | 62 | >250i |
| *Microsporum gypseum* E-28 | 31 | >250i |
| *Penicillium digitatum* P-308B | 125 | >250i |
| *Chaetomium globosum* H-71 | 125 | 250 |

In addition, the compounds of this invention have shown anti-inflammatory activity when tested by the three procedures described hereinbelow. The ultraviolet-induced erythema test and the yeast-induced pyrexia test and the statistical criteria derived using statisical techniques are described in a report by C. W. Dunnett and R. A. Lamm, "Sequential Procedure For Drug Screening," presented at the September, 1962, meeting of the American Statistical Association. The procedures are as follows:

(1) Carrageenin-induced rat paw edema

In this test weanling Sherman strain rats ranging in weight from 50–55 grams are used and fed standard laboratory diet ad libitum. The test compound is administered to the rats by gavage (250 milligrams per kilogram in a volume of 1.7 milliliters of buffered aqueous starch) one hour prior to challenge with carrageenin. The challenge agent, carrageenin, is obtained from Marine Colloids, 2 Edison Place, Springfield, N.J., and prepared as a sterile 1% suspension in 0.09% aqueous sodium chloride. A volume of 0.05 milliliter is injected using a 26-gauge needle into the plantar tissue of the right hind paw of treated and untreated rats. Measurements of the volumes of the carrageenin inflamed right (challenged) paw and left (unchallenged) paw are determined 4 hours subsequent to the carrageenin challenge. The method of determining paw volumes is carried out essentially as described by C. A. Winter et al., in Proc. Soc. Exptl. Biol. Med. 111: 544–547 (1962), using mercury immersion.

The differences in volume between the two paws of each rat is considered to be the volume of the carrageenin induced edema. The mean edema volume of eight control rats divided by the mean edema volume of two treated rats is calculated and designated the $C/T$ efficacy ratio. A compound is considered active in this test if the mean $C/T$ efficacy ratio of 2 consecutive tests is equal to or greater than 1.43.

(2) Rat ear ultraviolet-induced erythema

Test compounds are administered orally to groups of 3 rats each (Sherman strain rats, weighing 50+5 grams each) in dosages of 250 milligrams per kilogram of body weight in a 2% acacia vehicle. One hour after administration of the compounds, the treated rats and control rats are subjected to dermal ultraviolet irradiation of the right ear for 90 seconds with a 550 watt Hanovia lamp. At two hours post-irradiation, the irradiated sites of both test and control rats are visually graded as to the degree of induced erythema on a scale of 0 to 4.0 where 0 represents a minimum degree of erythema and 4.0 represents a maximum degree of erythema. The averaged numerical value of each group is then appropriately inserted into the ratio of control rats to treated rats, abbreviated $C/T$. The test is designed in three sequential stages, so that an acceptable compound requires three testing stages, although one, two or three stages may be required for rejection. Those test compounds are judged active in which the geometric mean of the $C/T$ values of rats observed is above 1.20 at stage one, above 1.63 at stage two, and above 2.20 at stage three, and at which latter point a compound is accepted as an active anti-inflammatory agent. If at any stage the geometric means of the $C/T$ values is below the above-mentioned critical values, the compound is rejected as being inactive.

(3) Yeast-induced pyrexia in rats

To groups of three Sherman strain rats, weighing 55±5 grams each are administered subcutaneously in the napes of the necks, 0.6 milliliter of a 40% suspension of dried yeast in distilled water. Each test compound is then administered orally at a dosage of 250 milligrams per kilogram in a 2% acacia vehicle at seventeen hours post-challenge. Control rats are treated in a similar manner but are not given the test compounds. At nineteen hours post-challenge the rectal temperature of each rat is recorded. The averaged numerical temperature for each group is then appropriately inserted into the relationship of control rats minus treated rats, abbreviated $C-T$. The test is designed in three sequential states, so that an acceptable compound requires three testing stages although one, two or three stages may be required for rejection. Those test compounds are judged active in which the $C-T$ value is above 0.44 at stage one, and the averaged $C-T$ value of both runs is above 0.55 at stage two, and the averaged $C-T$ value of three runs is above 0.61 at stage three, at which latter point the compound is accepted as an active anti-pyretic agent. If at any stage the average of the $C-T$ values is below the above-mentioned critical values, the compound is rejected as being inactive.

In a representative operation, the results obtained with the compounds of the present invention in Tests 1, 2 and 3 described hereinabove are set forth in Table III below.

As antibacterials or antifungals, the compounds of this invention may be administered orally or parenterally in the usual pharmaceutical forms, or possibly in the diet, and/or as compositions of active ingredient in an edible carrier. Such compositions may include tablets, scored or unscored, or hard or soft shell capsules. Excipients may include lactose, starch, buffers, disintegrating agents, lubricants, homogenizing agents, and the like. Oral and parenteral compositions may include similar agents and also preservatives, emulsifiers, surfactants, stabilizers and the like in solutions, suspensions, syrups, elixirs, etc. in either aqueous or non-aqueous systems. Additional excipients might include sweeteners, flavorings, colorings, or perfumes. Topical preparations, it is expected, will prove particularly useful. Such compositions would be designed for administration to subjects exposed to, or infected with sensitive bacteria or fungi for either treatment or prophylaxis and may include, in addition to the foregoing, ointments, creams, emulsions, unguents, salves, emollients, sprays, washes or the like. In addition, compounds of this invention may be used in the form of solutions, suspensions, emulsions, washes, powders, dusts, mists, soaps, sprays, aerosols, drenches, or other forms for the purpose of cleaning, disinfecting, or sterilizing surgical instruments, laboratory glassware or instruments, hospital walls or other surfaces, linens, dishes, laboratory tables, coops, cages, or the like. Likewise these compounds might be incorporated into soaps, detergents, sprays or the like in the home, farm, office or elsewhere with the purpose of preventing or minimizing infection or contamination with sensitive bacteria or fungi. Painting, spraying, immersion or other means of effecting contact may be applied. As anti-inflammatory agents, the compounds of this invention may be used in any of the pharmaceutical forms or modes accepted in the pharmaceutical art, such as suggested hereinabove.

The invention will be described in greater detail in conjunction with the following specific examples.

EXAMPLE 1

Preparation of 4-guanidino-3-nitropyridine

A suspension of sodium t-butoxide in t-butanol was prepared from sodium hydride (48.0 g., 1.0 mole of 50% suspension in mineral oil) and t-butanol (2000 ml.). The mixture was allowed to stand at room temperature for 1 hour and guanidine hydrochloride (105.1 g., 1.1 mole) was then added, and the mixture warmed on a steam bath for 30 minutes. The mixture was then filtered and the precipitate washed with t-butanol (200 ml.). The combined filtrates were then added over 4 hours to a rapidly stirred solution of 4-chloro-3-nitropyridine (79.3 g., 0.5 mole) in t-butanol (200 ml.) at 25° C. After addition was complete, the mixture was stirred for a further hour. The reaction mixture was evpaorated under reduced pressure, and the residue extracted (5× 100 ml.) with hot ethanol. Mineral oil was separated from the ethanolic extract, which was then evaporated to dryness. The residue was washed with water (3× 100 ml.) until free of chloride ions, and recrystallized twice from ethanol, using 100 mg. Darco 9–60 each time, to give fine orange-yellow needles, 20.5 g. (22%), M.P. 202.5–204° C. (dec.). An analytical sample was recrystallized from ethanol to give fine orange-yellow needles, M.P. 204.5–205.5° C. (dec.).

TABLE III.—ANTI-INFLAMMATORY TESTING

| Compound | Test 1. Carrageenin-induced rat paw edema | | Test 2. Rat ear ultraviolet-induced erythema | | Test 3. Yeast-induced pyrexia in rats | | |
| --- | --- | --- | --- | --- | --- | --- | --- |
| | Dose, mg./kg. | Mean C/T ratio (4 rats) | Dose, mg./kg. | Mean C/T ratio (9 rats) | Dose, mg./kg. | Temp., C–T | No. rats |
| 3-aminopyrido[4,3-e]-as-triazine | 250 | ¹ 2.15 | 250 | ¹ 7.16 | 250 | ¹ 3.15 | 6 |
| 3-aminopyrido[4,3-e]-as-triazine-1-oxide | 250 | ¹ 1.58 | | | 250 | ¹ 1.33 | 9 |

¹ Active.

EXAMPLE 2

Preparation of 3-aminopyrido[4,3-e]-as-triazine 1-oxide

To a solution of 4-guanidino-3-nitropyridine (14.0 g., 0.077 mole) in water (200 ml.) at 100° C., was added a solution of potassium carbonate (60 g.) in water 150 ml.) at 100° C. The mitxure was heetad for 5 minutes at 100° C., and allowed to cool. The product crystallized from the hot solution and was isolated by filtration on cooling, to give fine yellow needles, 11.1 g. (88%), M.P. 291–292° C. (dec.). A sample was recrystallized for analysis from water, to give fine yellow needles, M.P. 292–293° C. (dec.).

EXAMPLE 3

Preparation of 3-aminopyrido[4,3-e]-as-triazine 3-aminopyrido[4,3-e]1as-triazine-1-oxide (4.89 g., 0.03 mole) was added to a solution of sodium hydrosulfite (12.81 g., 0.061 mole) in water (75 ml.) and the mixture stirred at room temperature for 1 hour. The precipitate that formed was isolated by filtration and dissolved in water (70 ml.) containing potassium ferricyanide (22.5 g.) and sufficient ammonium hydroxide to make the solution quite basic. A yellow precipitate formed and was isolated by filtration and recrystallized from water using Darco 9–60 (50 mg.), to give a yellow solid, 2.96 g. (67%), M.P. 277–279° C. (dec.).

We claim:
1. A compound selected from the group consisting of 3-aminopyrido[4,3-e]-as-triazine and the non-toxic acid-addition salt thereof.
2. A compound selected from the group consisting of 3 - aminopyrido[4,3-e]-as-triazine-1-oxide and the non-toxic acid-addition salts thereof.

References Cited

UNITED STATES PATENTS

| 3,137,693 | 6/1964 | Carbon | 260—249.5X |
| 3,349,088 | 10/1967 | Molnar | 260—248 |

NORMA S. MILESTONE, Primary Examiner

J. M. FORD, Assistant Examiner

U.S. Cl. X.R.
260—296; 424—249